Jan. 15, 1952     A. E. CHURCH     2,582,680
WORK HOLDING CHUCK
Filed Jan. 14, 1948
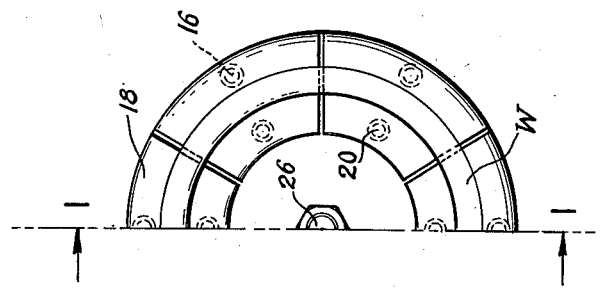
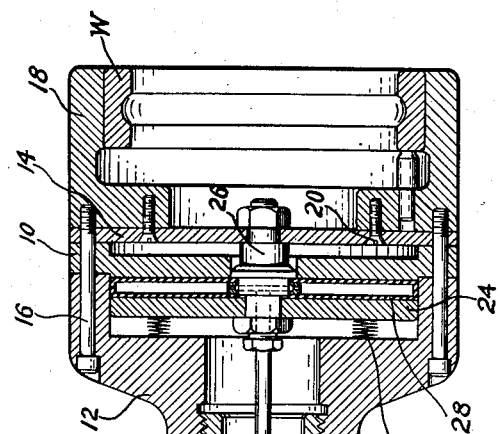
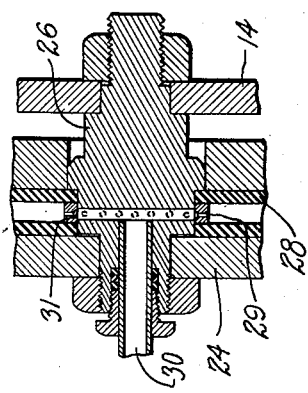
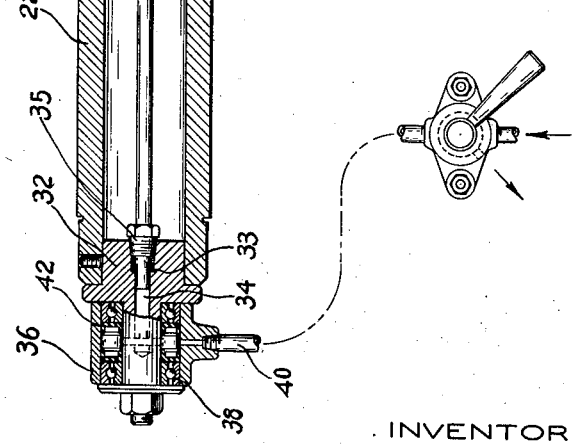
INVENTOR
A. E. CHURCH
BY Joseph F. Schofield
ATTORNEY Patented Jan. 15, 1952

2,582,680

UNITED STATES PATENT OFFICE 2,582,680

WORK HOLDING CHUCK

Albert E. Church, New Britain, Conn., assignor to Union Manufacturing Company, New Britain, Conn., a corporation of Connecticut Application January 14, 1948, Serial No. 2,299

2 Claims. (Cl. 279—4)

This invention relates to work holding chucks adapted for application to machines in which the work piece is required to be rotated upon a fixed axis.

More particularly, the invention relates to a work holding chuck of the diaphragm type, the flexing of the diaphragm being used to open and close the jaws slightly relative to the work piece to release or grip the work piece.

A primary object of the invention is to provide improved operating means for a diaphragm chuck by means of air or other elastic fluid admitted to the spindle at its end remote from the chuck.

Another object of the invention is to provide an expansible impervious bag within the chuck body member into which fluid under pressure may be admitted to expand the bag and deflect the diaphragm to which the chuck jaws are attached, the flexing of the diaphragm by expanding the bag serving to force the jaws into gripping contact with the work piece.

With the above and other objects in view the invention includes the features of construction and operation set forth in the following specification and illustrated in the accompanying drawing:

In the accompanying drawing annexed hereto and forming a part of this specification, I have shown the invention embodied in a lathe or other machine tool spindle but it will be understood that the invention can be otherwise embodied and that the drawing is not to be construed as defining or limiting the scope of the invention, the claims appended to this specification being relied upon for that purpose.

In the drawing:

Fig. 1 is a central longitudinal section through a chuck made according to the present invention;

Fig. 2 is a fragmentary front view of the chuck shown in Fig. 1, and

Fig. 3 is a detail view of one of the parts forming the chuck.

In the above mentioned drawing, there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First a chuck body; second, a slightly flexible metal diaphragm; third, chuck jaws fixed to said diaphragm; fourth, an expansible impervious bag within the chuck body; fifth, a movable member adjacent the bag; sixth, means connecting the diaphragm and movable member so that movement of the member flexes the diaphragm, and seventh, fluid admitting means to the expansible bag during rotation of the chuck.

Referring more in detail to the figures of the drawing there is shown a chuck body comprising a disk 10 to which is fixedly attached a head or end piece 12 in a manner to form a short cylindrical opening between their adjacent surfaces. On the opposite side of the disk 10 is a diaphragm 14 attached at its periphery to the rim of the disk 10 by means of elongated screws 16. As shown in Fig. 1, screws 16 retain in fixed relation the end piece 12, the disk 10 and the diaphragm 14. The jaws 18 are attached to the diaphragm 14 by the threaded ends of screws 16 and by additional screws 20. By this construction the members forming the chuck are held in position and so that the diaphragm 14 may flex slightly and radially move the work engaging portions of the jaws 18. The chuck is mounted for rotation on a hollow spindle such as shown at 22 by engagement with the spindle by internal threads on the end piece 12.

The jaws 18 preferably may be formed from an annulus having the same outer diameter as the disk 10 and diaphragm 14 by slitting the annulus radially into as many individual jaw members as desired. Each of the jaw members 18 is secured to the diaphragm 14 by screws 16 and 20 and the work engaging surfaces of the jaws is machined to fit the particular work piece W being operated on.

To flex the diaphragm 14 to tighten the jaws 18 upon work piece W fluid pressure means are employed. Within the recess formed between the disk 10 and the end piece 12 is a plate 24 attached at its center to the diaphragm 14 by a stud or bolt 26. Between the plate 24 and the disk 10 is an annular expansible impervious bag 28 preferably made of rubber or other similar material. This bag 28 as shown surrounds the stud 26 to which portions of the bag may be sealed and substantially fills the recess between disk 10 and plate 24. By admitting air or other gas under pressure to the interior of the bag 28 the plate 24 will be forced away from the disk 10 against the pressure of springs 25 and the diaphragm 14 will be flexed to force the jaws 18 into gripping contact with the outer surface of work piece W. In the position of the bag 28 and diaphragm 14 shown in Fig. 1, no pressure is being applied to the plate 24 and diaphragm and the jaws are open to permit work pieces to be inserted.

To admit air or other fluid under pressure to the interior of the bag 28 to flex the diaphragm 14 and grip the work piece W by the jaws openings or conduits are provided within the stud 26 which in turn communicate with an elognated tube 30 extending to the tail end of spindle 22. An end piece 32 is inserted within the spindle 22 and an opening 34 therein communicates with the tube 30 to which member 32 may be secured in fluid tight relation. Surrounding the extended portion of member 32 is a sleeve 36 rotatable on the member 32 by suitable anti-friction bearings 38. A fluid supply line 40 may be attached to the sleeve 36 permitting fluid to enter the opening 34 within member 32 and through tube 30 into the interior of bag 28. To maintain fluid tight relation between the member 32 and the sleeve 36 cup washers 42 are inserted between the sleeve and end member on either side of the opening 34 and bearing against the adjacent end surfaces of the bearings.

To connect the inflatable bag 28 to the stud 26 a ring 29, provided with an annular recess 31 formed within its inner surface and suitable radial openings, may be mounted on an intermediate surface. The recess 31 permits air under pressure to pass from the tube 30 through the stud 26 and to the space within the inflatable bag. The end of the tube 30 entering stud 26 may be sweated therein or otherwise sealed to the stud in pressure tight relation. By means of a suitable nut on the inner end of the stud plate 24 is held firmly in position and retains the surfaces of the bag in pressure tight relation to the surfaces of the ring 29 which is disposed between the surfaces of the bag.

The opposite end of the tube 30 may be fitted into the end piece 32 in a manner to permit movement of the tube axially relative to the end piece as the diaphragm 14 is flexed by admission or exhaustion of the air to and from the bag 28. For this purpose a packing 33 may be placed around the tube 30 within the end piece 32, this packing being held in place by a suitable gland 35.

I claim as my invention:

1. A work engaging chuck comprising a body member, a diaphragm therein, chuck jaws secured to said diaphragm and movable to work gripping position when said diaphragm is flexed, an axially movable plate within said chuck body attached at its center to said diaphragm, an inflatable impervious bag within said chuck body and disposed between said movable plate and a fixed wall of said chuck, means to admit fluid under pressure to said bag to displace said movable plate and flex said diaphragm, whereby said jaws are moved to work gripping position, and means to return said diaphragm to inoperative position when pressure within the bag is released.

2. A work engaging chuck comprising a body member, a diaphragm therein, chuck jaws secured to said diaphragm and movable to work gripping position when said diaphragm is flexed, a fixed disk within said chuck, an axially movable member attached centrally to said diaphragm, an annular impervious inflatable bag disposed between said fixed disk and movable member whereby inflating said bag displaces said movable member from said fixed disk and flexes said diaphragm, and means at the end of the spindle mounting said chuck to admit fluid under pressure to within said bag during rotation of said chuck.

ALBERT E. CHURCH.

REFERENCES CITED

The following references are of record in the file of this patent:

UNITED STATES PATENTS

| Number | Name | Date |
|---|---|---|
| 1,389,272 | Scaife | Aug. 30, 1921 |
| 1,956,318 | Draper | Apr. 24, 1934 |
| 2,267,815 | Bush | Dec. 30, 1941 |
| 2,376,475 | Bush | May 22, 1945 |
| 2,389,366 | Jones | Nov. 20, 1945 |
| 2,396,521 | Mead | Mar. 12, 1946 |
| 2,428,496 | Mead | Oct. 7, 1947 |
| 2,491,611 | Hohwart et al. | Dec. 20, 1949 |